United States Patent
Niu et al.

(10) Patent No.: US 11,391,257 B2
(45) Date of Patent: Jul. 19, 2022

(54) POWER SUPPLY DURING VEHICLE STARTUP

(71) Applicant: Ford Global Technologies, LLC, Dearborn, MI (US)

(72) Inventors: Yuming Niu, Northville, MI (US); Ming Lang Kuang, Canton, MI (US); Mark Douglas Malone, Canton, MI (US); Daniel M. King, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 425 days.

(21) Appl. No.: 16/519,025

(22) Filed: Jul. 23, 2019

(65) Prior Publication Data
US 2021/0025365 A1  Jan. 28, 2021

(51) Int. Cl.
*F02N 11/08* (2006.01)
*H01M 10/44* (2006.01)
(Continued)

(52) U.S. Cl.
CPC ......... *F02N 11/0866* (2013.01); *B60L 58/12* (2019.02); *B60L 58/20* (2019.02);
(Continued)

(58) Field of Classification Search
CPC ......... F02N 2011/0888; F02N 11/0866; H02J 3/14; H02J 3/32; H02J 3/322;
(Continued)

(56) References Cited

U.S. PATENT DOCUMENTS 5,938,705 A * 8/1999 Zyburt ............... G05D 1/0265
  701/24
6,066,899 A  5/2000 Rund et al.
(Continued)

FOREIGN PATENT DOCUMENTS

JP  2017134506 A  8/2017
JP  6460875 B2  1/2019

OTHER PUBLICATIONS

Non-Final Office Action re U.S. Appl. No. 16/519,026, filed Jul. 23, 2019.
(Continued)

*Primary Examiner* — Helen Rossoshek
(74) *Attorney, Agent, or Firm* — Frank A. MacKenzie; Bejin Bieneman PLC (57) ABSTRACT

A system includes a virtual-driver module, a DC/DC converter electrically coupled to the virtual-driver module, a low-voltage battery electrically coupled to the virtual-driver module, a high-voltage battery electrically coupled to the DC/DC converter, and a computer communicatively coupled to the DC/DC converter. The computer is programmed to, in response to a request to start a vehicle including the virtual-driver module in a manual mode, the vehicle being in an off state at the time of the request, set a setpoint of the DC/DC converter at a first voltage; then perform at least one pre-drive test on the vehicle; and then set the setpoint of the DC/DC converter at a second voltage lower than the first voltage.

18 Claims, 6 Drawing Sheets

(51) Int. Cl.
  *B60L 58/12* (2019.01)
  *B60L 58/20* (2019.01)
  *G06F 8/65* (2018.01)

(52) U.S. Cl.
  CPC .............. *G06F 8/65* (2013.01); *H01M 10/44* (2013.01); *H02J 2207/20* (2020.01)

(58) Field of Classification Search
  CPC ........ H02J 2207/20; B60L 1/00; B60L 58/12; B60L 50/60; B60L 58/20; G06F 30/15; G06F 3/011; G06F 3/016; G06F 8/65; H01M 10/44; H01M 10/425; H01M 2010/4271; H01M 2220/20; Y02E 60/10; Y02E 10/70; Y02E 90/16; B60W 10/06; B60W 10/08; B60W 10/184; B60W 10/20; B60W 50/00; B60W 60/0023; B60W 2050/0043; B60W 2710/06; B60W 2710/08; B60W 2710/18; B60W 2710/20
  See application file for complete search history.

(56) References Cited

U.S. PATENT DOCUMENTS

| | | | |
|---|---|---|---|
| 6,452,361 B2 | 9/2002 | Dougherty et al. | |
| 8,493,022 B2* | 7/2013 | Bertness | G01R 31/3648 |
| | | | 320/104 |
| 8,655,541 B2 | 2/2014 | You | |
| 8,813,061 B2 | 8/2014 | Hoffman et al. | |
| 9,229,704 B2 | 1/2016 | Throop et al. | |
| 9,404,977 B2* | 8/2016 | Tran | G01R 31/396 |
| 9,421,474 B2* | 8/2016 | Derby, Jr. | A63H 19/24 |
| 9,457,684 B2 | 10/2016 | Crombez et al. | |
| 9,533,597 B2* | 1/2017 | Li | B60L 50/16 |
| 9,550,421 B2* | 1/2017 | Harkins | B60L 3/003 |
| 9,575,743 B1 | 2/2017 | Chun | |
| 9,701,264 B2* | 7/2017 | Aboudaoud | B60R 16/03 |
| 9,702,315 B1* | 7/2017 | Palmer | B60Q 1/00 |
| 9,738,125 B1* | 8/2017 | Brickley | B60W 50/14 |
| 9,754,325 B1* | 9/2017 | Konrardy | B60W 40/09 |
| 9,921,650 B2* | 3/2018 | Levesque | G06F 3/016 |
| 9,960,637 B2* | 5/2018 | Sanders | H02J 3/381 |
| 10,289,194 B2* | 5/2019 | McCracken | A63F 13/30 |
| 10,521,677 B2* | 12/2019 | Micks | B60W 40/00 |
| 10,739,404 B2* | 8/2020 | Wandres | H02H 3/044 |
| 10,832,093 B1* | 11/2020 | Taralova | G06T 15/04 |
| 10,908,051 B2* | 2/2021 | Yang | G06V 20/56 |
| 10,981,526 B2* | 4/2021 | Celinske | B62D 6/008 |
| 11,052,900 B2* | 7/2021 | Shibata | B60W 10/06 |
| 11,099,561 B1* | 8/2021 | Kentley-Klay | B60W 50/082 |
| 2013/0079950 A1 | 3/2013 | You | |
| 2013/0245884 A1 | 9/2013 | Foruntanpour et al. | |
| 2015/0268722 A1* | 9/2015 | Wang | A63F 13/837 |
| | | | 345/156 |
| 2016/0245724 A1* | 8/2016 | Sasaki | G06T 11/206 |
| 2017/0076019 A1* | 3/2017 | Nallapa | G09B 9/04 |
| 2017/0109458 A1* | 4/2017 | Micks | G06F 30/20 |
| 2017/0109928 A1* | 4/2017 | Micks | G09B 9/042 |
| 2018/0091847 A1* | 3/2018 | Wu | H04N 21/4333 |
| 2018/0264347 A1* | 9/2018 | Tran | A63B 71/145 |
| 2018/0286268 A1* | 10/2018 | Ni | G06F 3/017 |
| 2018/0345971 A1* | 12/2018 | Birnschein | B60K 7/0007 |
| 2019/0050050 A1* | 2/2019 | Jung | G06F 1/1694 |
| 2019/0322286 A1* | 10/2019 | Stefan | G06F 30/15 |
| 2019/0329758 A1 | 10/2019 | Takahashi et al. | |
| 2019/0351895 A1* | 11/2019 | Ben-Ari | B60W 10/28 |
| 2020/0001806 A1* | 1/2020 | Celinske | B60L 1/00 |
| 2020/0039367 A1* | 2/2020 | Lyden | B60L 53/31 |
| 2021/0023960 A1* | 1/2021 | Niu | B60L 58/12 |
| 2021/0094491 A1 | 4/2021 | Yamashita | |
| 2021/0362664 A1* | 11/2021 | Yang | H04L 67/125 |

OTHER PUBLICATIONS

Final Office Action dated May 17, 2022 re U.S. Appl. No. 16/519,026, filed Jul. 23, 2019.

* cited by examiner

POWER SUPPLY DURING VEHICLE STARTUP

BACKGROUND

Vehicles can include propulsion to generate energy and translate the energy into motion of the vehicle. Types of propulsions include a conventional powertrain including an internal-combustion engine coupled to a transmission that transfers rotational motion to wheels; an electric powertrain including high-voltage batteries, an electric motor, and a transmission that transfers rotational motion to the wheels; and a hybrid powertrain including elements of the conventional powertrain and the electric powertrain. Vehicles of any propulsion type typically also include low-voltage batteries.

In normal operation when the vehicle is on, electrical loads are typically powered by the engine and/or the high-voltage batteries without drawing power from the low-voltage batteries. The low-voltage batteries supply power to start the vehicle, as well as in the event of transient demands from the loads for greater power than the engine and/or high-voltage batteries can supply. When the vehicle is off, electrical loads are reduced, and the remaining electrical loads are typically powered by the low-voltage batteries.

DETAILED DESCRIPTION

The system described herein can preserve a battery charge while a vehicle is in an off state and while the vehicle is starting up. The system can select a source of power to most optimally draw from in response to requests in order to provide sufficient power, and can provide an optimal amount of power based on the type of request. The system can also select which power relay to be energized and which module to be powered on while leaving the rest of vehicle in off state, which can also provide for efficient power consumption.

A system includes a virtual-driver module, a DC/DC converter electrically coupled to the virtual-driver module, a low-voltage battery electrically coupled to the virtual-driver module, a high-voltage battery electrically coupled to the DC/DC converter, and a computer communicatively coupled to the DC/DC converter. The computer is programmed to, in response to a request to start a vehicle including the virtual-driver module in a manual mode, the vehicle being in an off state at the time of the request, set a setpoint of the DC/DC converter at a first voltage; then perform at least one pre-drive test on the vehicle; and then set the setpoint of the DC/DC converter at a second voltage lower than the first voltage.

A system includes a computer including a processor and a memory storing instructions executable by the processor to, in response to a request to start a vehicle in a manual mode, the vehicle being in an off state at the time of the request, put a virtual-driver module in a high-power-draw state; then perform at least one pre-drive test on the vehicle; and then put the virtual-driver module in a low-power-draw state.

The system may further include a DC/DC converter electrically coupled to the virtual-driver module and communicatively coupled to the computer, and putting the virtual-driver module in the high-power-draw state may be setting a setpoint of the DC/DC converter at a first voltage, and putting the virtual-driver module in the low-power-draw state may be setting the setpoint of the DC/DC converter at a second voltage lower than the first voltage.

Performing the pre-drive test may include at least one of determining whether a charge of a battery is sufficiently high to put the vehicle in a minimal risk condition, performing a steering action and determining whether data from steering-angle sensors match the steering action, or performing a braking action and determining whether data from brake sensors match the braking action.

The instructions may further include to, in response to a request for an action by a control module while the vehicle is in the off state, provide power to the control module from a low-voltage battery upon determining that a charge of the low-voltage battery is below a threshold that is based on a power demand of the action. The instructions may further include to, in response to the request for the action by the control module while the vehicle is in the off state, initialize a high-voltage battery and provide power to the control module from the high-voltage battery upon determining that the charge of the low-voltage battery is above the threshold. The system may further include a DC/DC converter electrically coupled to the control module and communicatively coupled to the computer, and providing power to the control module from the high-voltage battery may include setting a setpoint of the DC/DC converter based on the power demand of the action.

The action may be downloading an update for the control module.

A method includes, in response to a request to start a vehicle in a manual mode, the vehicle being in an off state at the time of the request, putting a virtual-driver module in a high-power-draw state; then performing at least one pre-drive test on the vehicle; and then putting the virtual-driver module in a low-power-draw state.

Putting the virtual-driver module in the high-power-draw state may be setting a setpoint of a DC/DC converter electrically coupled to the virtual-driver module at a first voltage, and putting the virtual-driver module in the low-power-draw state may be setting the setpoint of the DC/DC converter at a second voltage lower than the first voltage.

Performing the pre-drive test may include at least one of determining whether a charge of a battery is sufficiently high to put the vehicle in a minimal risk condition, performing a steering action and determining whether data from steering-angle sensors match the steering action, or performing a braking action and determining whether data from brake sensors match the braking action.

The method may further include, in response to a request for an action by a control module while the vehicle is in the off state, providing power to the control module from a low-voltage battery upon determining that a charge of the low-voltage battery is below a threshold that is based on a power demand of the action. The method may further include, in response to the request for the action by the control module while the vehicle is in the off state, initializing a high-voltage battery and providing power to the control module from the high-voltage battery upon determining that the charge of the low-voltage battery is above the threshold. Providing power to the control module from the high-voltage battery may include setting a setpoint of a DC/DC converter electrically coupled to the control module based on the power demand of the action.

The action may be downloading an update for the control module.

With reference to the Figures, a system 32 in a vehicle 30 includes a virtual-driver module 34, a DC/DC converter 38 electrically coupled to the virtual-driver module 34, a low-voltage battery 40 electrically coupled to the virtual-driver module 34, a high-voltage battery 42 electrically coupled to the DC/DC converter 38, and a computer 46 communicatively coupled to the DC/DC converter 38. The computer 46 is programmed to, in response to a request to start the vehicle 30 including the virtual-driver module 34 in a manual mode, the vehicle 30 being in an off state at the time of the request, set a setpoint of the DC/DC converter 38 at a first voltage; then perform at least one pre-drive test on the vehicle 30; and then set the setpoint of the DC/DC converter 38 at a second voltage lower than the first voltage.

Figure 1:
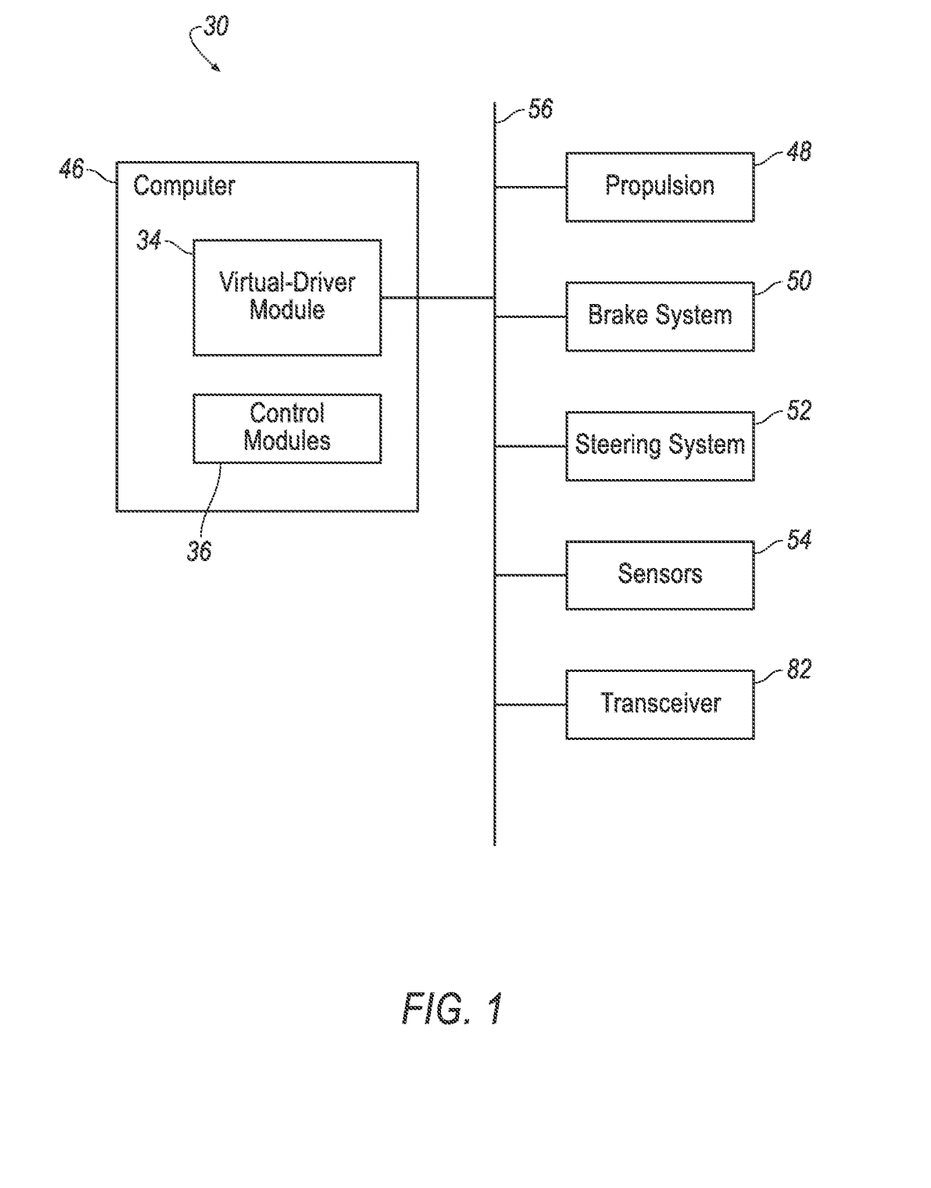
FIG. 1 is a block diagram of an example vehicle.

With reference to FIG. 1, the vehicle 30 may be any passenger or commercial automobile such as a car, a truck, a sport utility vehicle, a crossover, a van, a minivan, a taxi, a bus, etc.

The vehicle 30 is an autonomous or semi-autonomous vehicle. The virtual-driver module 34 can be programmed to operate the vehicle 30 independently of the intervention of a human driver, completely or to a lesser degree. The virtual-driver module 34 may be programmed to operate a propulsion 48, brake system 50, steering system 52, and/or other vehicle systems based on data provided by sensors 54. For the purposes of this disclosure, an autonomous mode means the virtual-driver module 34 controls the propulsion 48, brake system 50, and steering system 52 without input from a human driver; a semi-autonomous mode means the virtual-driver module 34 controls one or two of the propulsion 48, brake system 50, and steering system 52 and a human driver controls the remainder; and a manual mode means a human driver controls the propulsion 48, brake system 50, and steering system 52.

The virtual-driver module 34 is a microprocessor-based computer, typically, a single electronic control module (ECM). The virtual-driver module 34 includes a processor, memory, etc. The memory of the virtual-driver module 34 includes memory for storing instructions executable by the processor as well as for electronically storing data and/or databases.

The computer 46 is one or more microprocessor-based computers. The computer 46 includes memory, at least one processor, etc. The memory of the computer 46 includes memory for storing instructions executable by the processor as well as for electronically storing data and/or databases. The computer 46 may be the same controller as the virtual-driver module 34, or the computer 46 may be one or more separate controllers in communication with the virtual-driver module 34 via a communications network 56, or the computer 46 may include multiple controllers including the virtual-driver module 34. In other words, some, all, or none of the programming ascribed below to the computer 46 can be performed by the virtual-driver module 34. As a separate controller, the computer 46 may be or include, e.g., one or more electronic control units or modules 36 (ECUs or ECMs, referred to hereinafter as control modules) such as a hybrid-powertrain control module 58 and/or a battery-energy control module 60. Other control modules 36 may include a body control module 62, an antilock-brake control module 64, a first power-steering control module 66, a second power-steering control module 68, a collision-mitigation-system control module 70, an autonomous-vehicle platform-interface control module 72, an engine control module 74, an object-detection maintenance control module 76, a restraint control module 78, and an accessory control module 80 (shown in FIGS. 3A-C).

The computer 46 may transmit and receive data through the communications network 56, which may be a controller area network (CAN) bus, Ethernet, WiFi, Local Interconnect Network (LIN), onboard diagnostics connector (OBD-II), and/or by any other wired or wireless communications network. The computer 46 may be communicatively coupled to the virtual-driver module 34, the other control modules 36, the propulsion 48 including the DC/DC converters 38, the brake system 50, the steering system 52, the sensors 54, a transceiver 82, and other components via the communications network 56.

The sensors 54 may provide data about operation of the vehicle 30, for example, wheel speed, wheel orientation, and engine and transmission data (e.g., temperature, fuel consumption, etc.). The sensors 54 may detect the location and/or orientation of the vehicle 30. For example, the sensors 54 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 54 may detect the external world, e.g., objects and/or characteristics of surroundings of the vehicle 30, such as other vehicles, road lane markings, traffic lights and/or signs, pedestrians, etc. For example, the sensors 54 may include radar sensors, scanning laser range finders, light detection and ranging (LIDAR) devices, and image processing sensors such as cameras. The sensors 54 may include communications devices, for example, vehicle-to-infrastructure (V2I) or vehicle-to-vehicle (V2V) devices.

Figure 2:
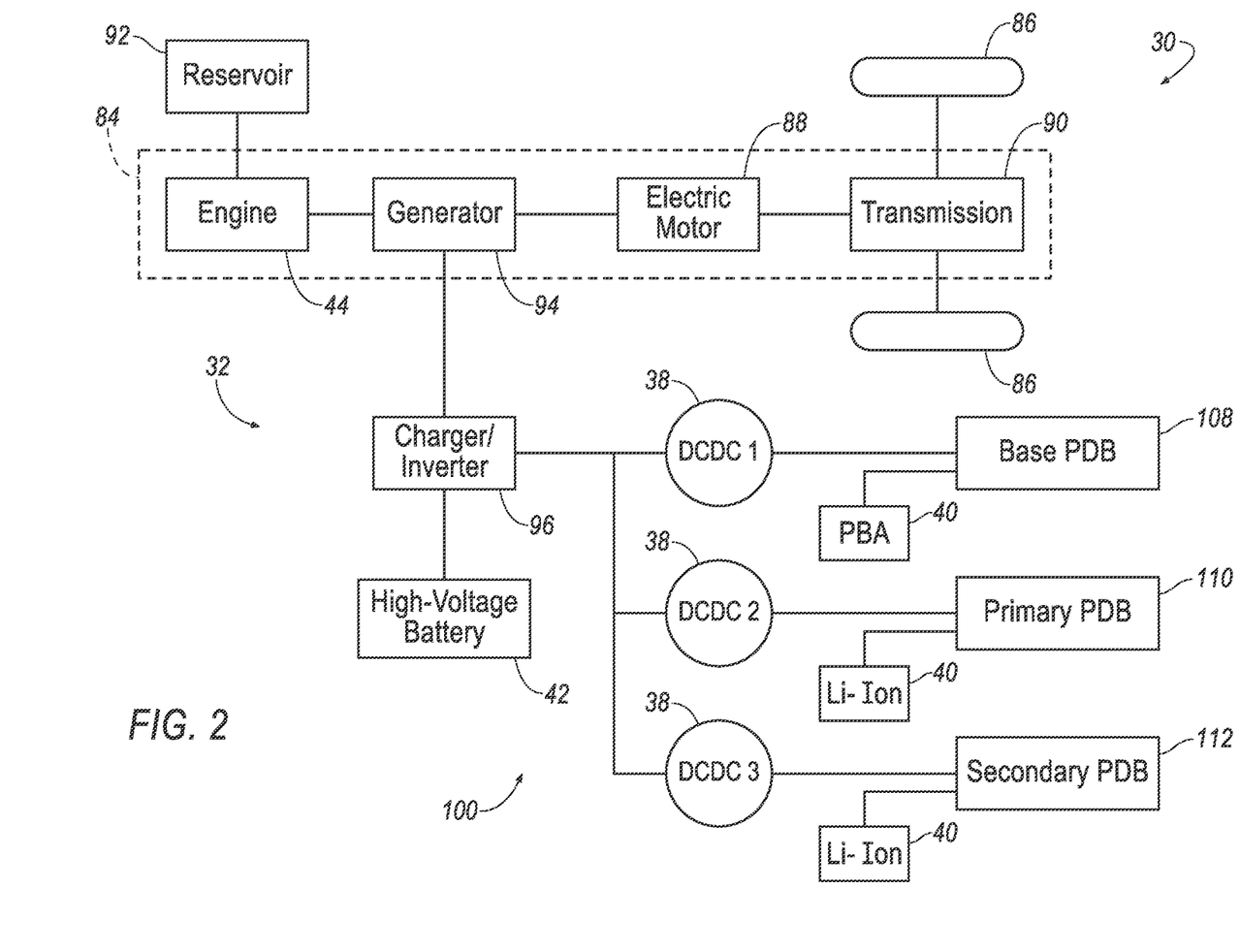
FIG. 2 is a block diagram of an example propulsion system of the vehicle of FIG. 1.

The propulsion 48 of the vehicle 30 generates energy and translates the energy into motion of the vehicle 30. As shown in FIG. 2, the propulsion 48 may be hybrid propulsion. The propulsion 48 may include a powertrain 84 in any hybrid arrangement, e.g., a series-hybrid powertrain (as shown in FIG. 2), a parallel-hybrid powertrain, a power-split (series-parallel) hybrid powertrain, etc. The propulsion 48 is described in more detail below with respect to FIG. 2. Alternatively, the propulsion 48 can be a plug-in hybrid propulsion or a battery electric propulsion. The propulsion 48 can include a control module 36 or the like, e.g., the hybrid-powertrain control module 58, that is in communication with and receives input from the virtual-driver module 34 and/or a human driver. The human driver may control the propulsion 48 via, e.g., an accelerator pedal and/or a gear-shift lever.

The brake system 50 is typically a conventional vehicle braking subsystem and resists the motion of the vehicle 30 to thereby slow and/or stop the vehicle 30. The brake system 50 may include friction brakes such as disc brakes, drum brakes, band brakes, etc.; regenerative brakes; any other suitable type of brakes; or a combination. The brake system 50 can include a control module 36 or the like, e.g., the antilock-brake control module 64, that is in communication with and receives input from the virtual-driver module 34 and/or a human driver. The human driver may control the brake system 50 via, e.g., a brake pedal.

The steering system 52 is typically a conventional vehicle steering subsystem and controls the turning of wheels 86. The steering system 52 may be a rack-and-pinion system with electric power-assisted steering, a steer-by-wire system, as both are known, or any other suitable system. The steering system 52 can include a control module 36 or the like, e.g., the first and/or second power-steering control modules 66, 68, that is in communication with and receives input from the virtual-driver module 34 and/or a human driver. The human driver may control the steering system 52 via, e.g., a steering wheel.

The transceiver 82 may be adapted to transmit signals wirelessly through any suitable wireless communication protocol, such as Bluetooth®, WiFi, IEEE 802.11a/b/g, other RF (radio frequency) communications, etc. The transceiver 82 may be adapted to communicate with a remote server, that is, a server distinct and spaced from the vehicle 30. The remote server may be located outside the vehicle 30. For example, the remote server may be associated with other vehicles (e.g., V2V communications), infrastructure components (e.g., V2I communications via Dedicated Short-Range Communications (DSRC) or the like), emergency responders, mobile devices associated with the owner of the vehicle 30, etc. The transceiver 82 may be one device or may include a separate transmitter and receiver.

With reference to FIG. 2, the propulsion 48 includes the powertrain 84 that transmits power from an engine 44, from the high-voltage battery 42, or from both the engine 44 and the high-voltage battery 42, through an electric motor 88 to a transmission 90 and ultimately to the wheels 86 of the vehicle 30. The engine 44 is an internal-combustion engine and may contain cylinders that serve as combustion chambers that convert fuel from a reservoir 92 to rotational kinetic energy. A generator 94 may receive the rotational kinetic energy from the engine 44. The generator 94 converts the rotational kinetic energy into electricity, e.g., alternating current, and powers the electric motor 88. A charger/inverter 96 may convert the output of the generator 94, e.g., the alternating current, into high-voltage direct current to supply the high-voltage battery 42 and a power-distribution system 100. For the purposes of this disclosure, "high voltage" is defined as at least 60 volts direct current or at least 30 volts alternating current. For example, the high-voltage direct current may be on the order of 300 volts. The charger/inverter 96 controls how much power is supplied from the high-voltage battery 42 to the generator 94 of the powertrain 84. The electric motor 88 may convert the electricity from the generator 94 into rotational kinetic energy transmitted to the transmission 90. The transmission 90 transmits the kinetic energy via, e.g., a drive axle to the wheels 86, while applying a gear ratio allowing different tradeoffs between torque and rotational speed.

The engine 44 is switchable between running and off. When running, the engine 44 is switchable between a motive state in which power is delivered to the wheels 86 and a nonmotive state in which power is not delivered to the wheels 86. For example, the engine 44 may be coupled to the transmission 90 in the motive state and decoupled from the transmission 90 in the nonmotive state, e.g., via a clutch (not shown).

The high-voltage battery 42 produces a voltage of at least 60 volts direct current, e.g., on the order of 300 volts direct current. The high-voltage battery 42 may be any type suitable for providing high-voltage electricity for operating the vehicle 30, e.g., lithium-ion, nickel-metal hydride, lead-acid, etc. The high-voltage battery 42 is electrically coupled to the powertrain 84 via the charger/inverter 96. The high-voltage battery 42 is electrically coupled to a plurality of loads 98 as described below.

Figure 3A:
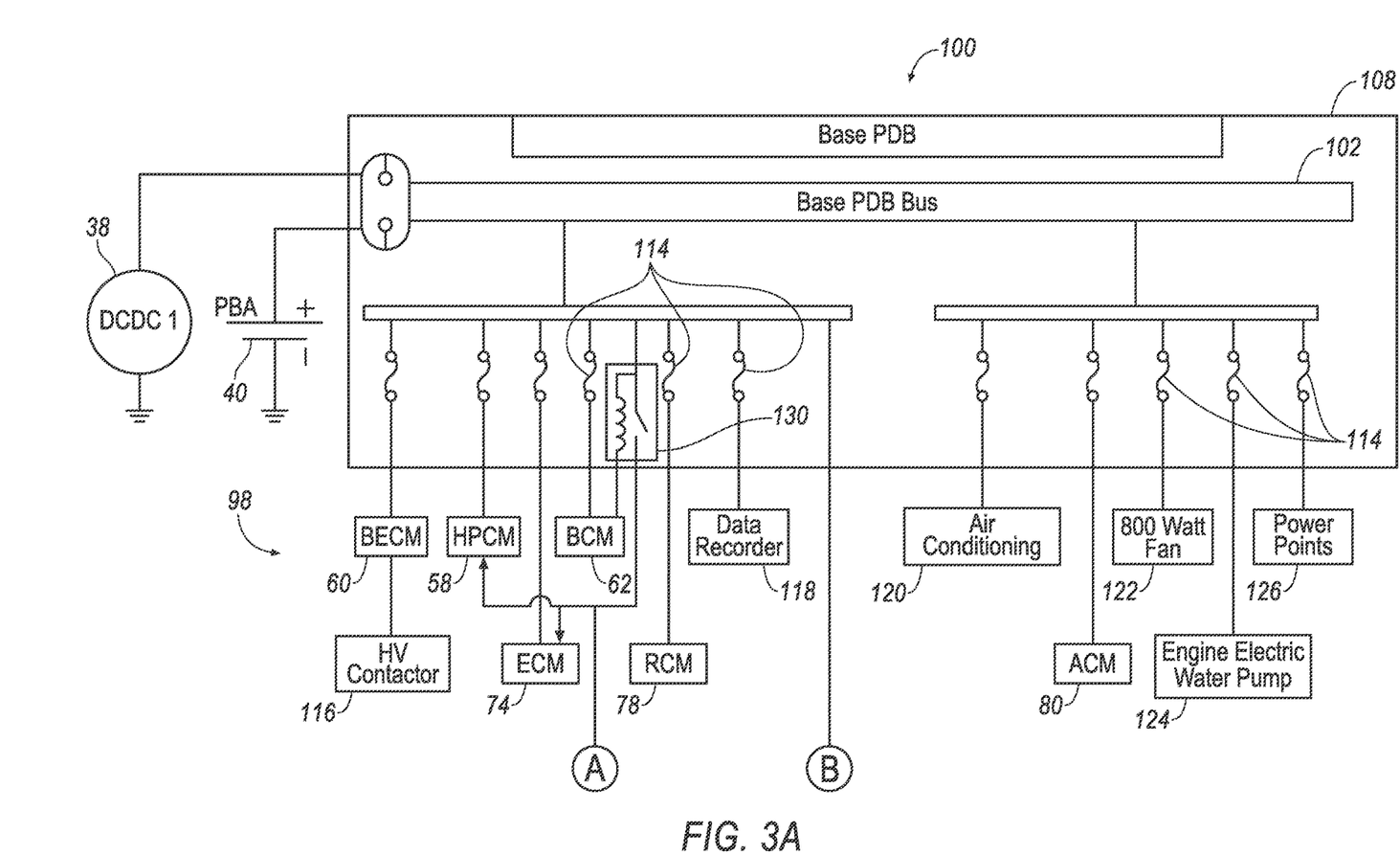
FIGS. 3A-C are circuit diagrams of an example power-distribution system of the vehicle of FIG. 1.
Figure 3B:
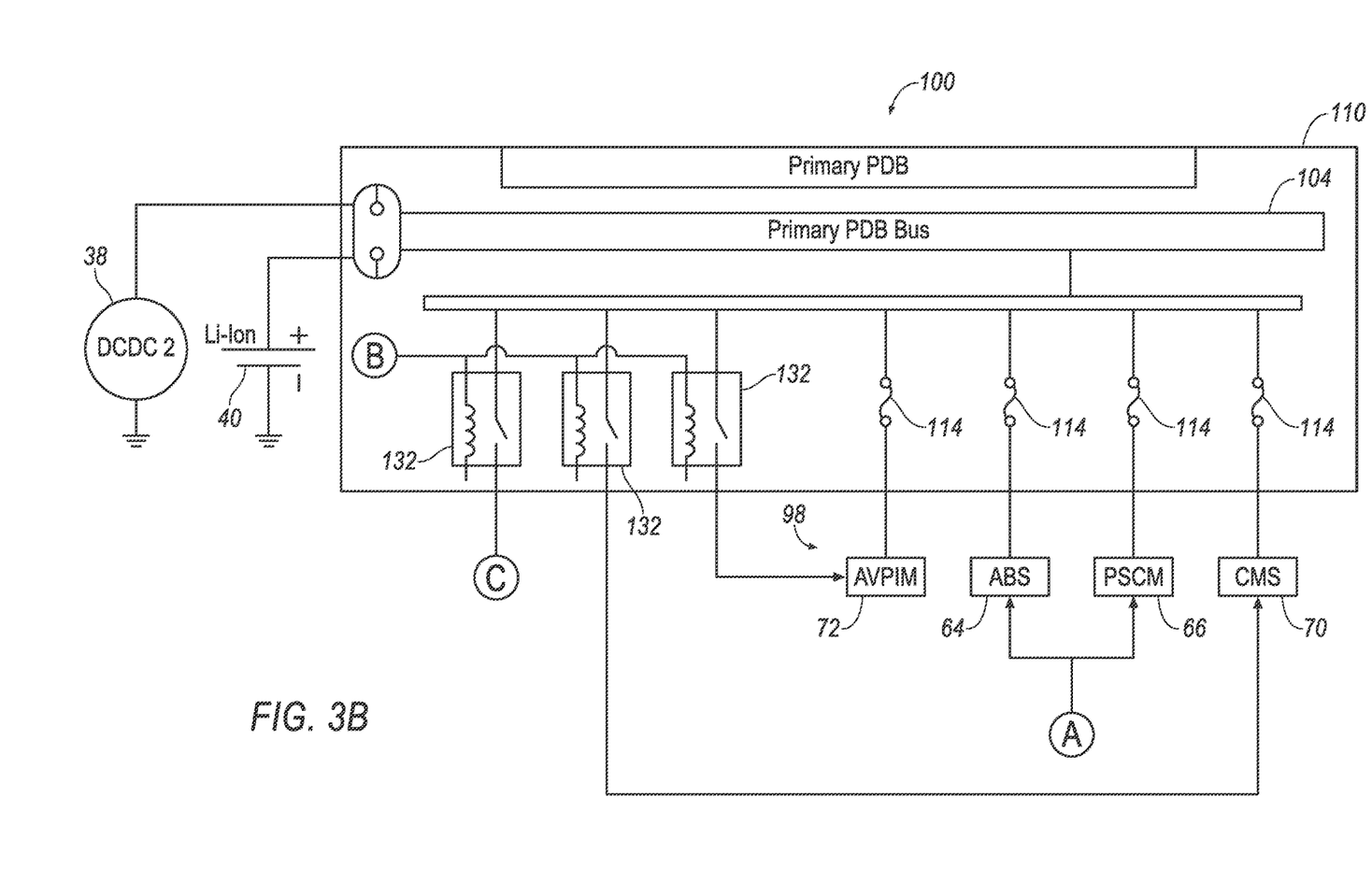
Figure 3C:
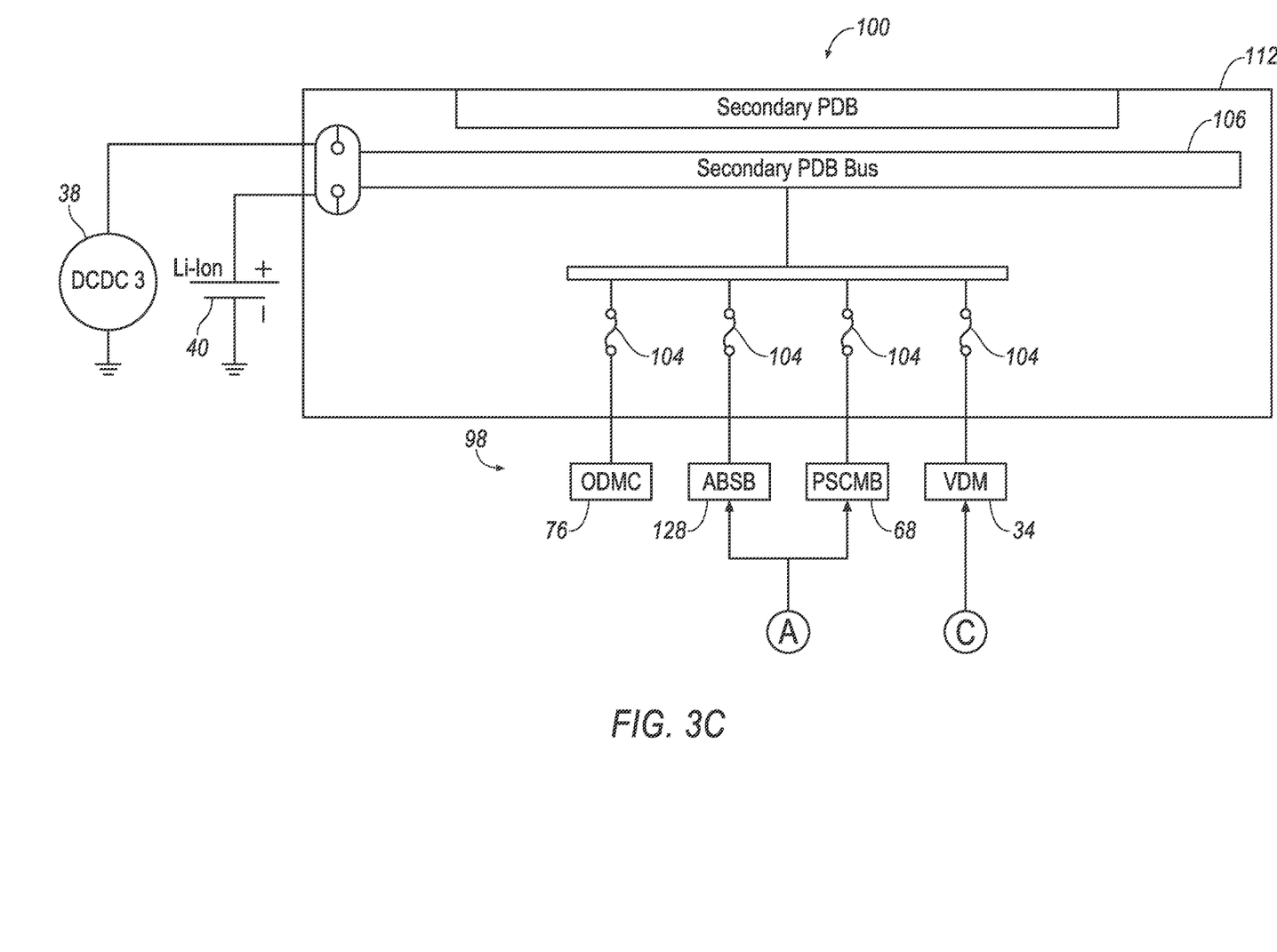

With reference to FIGS. 3A-C, the power-distribution system 100 includes the DC/DC converters 38. As shown in the example hybrid powertrain of FIG. 2, the DC/DC converters 38 are electrically coupled to the powertrain 84 via the charger/inverter 96 and to the low-voltage batteries 40. The DC/DC converters 38 may receive high-voltage direct current from the high-voltage battery 42 and/or from the engine 44 or electric motor 88 and convert the high-voltage direct current to low-voltage direct current; in general, for the hybrid arrangement as shown in FIG. 2 and for other arrangements of the propulsion 48, the DC/DC converters 38 convert high-voltage current from a high-voltage bus to low-voltage current for a low-voltage bus. For the purposes of this disclosure, "low voltage" is defined as less than 60 volts direct current or less than 30 volts alternating current. For example, the low-voltage direct current may be 12 volts or 48 volts. Each DC/DC converter 38 may exchange the low-voltage direct current with one of the low-voltage batteries 40, and each DC/DC converter 38 may supply the low-voltage direct current to one of a plurality of power-distribution-board buses 102, 104, 106.

The computer 46 can control the DC/DC converters 38 by setting a setpoint for each DC/DC converter 38. The setpoint is a voltage that the DC/DC converter 38 provides to the low-voltage bus, e.g., a respective power-distribution-board bus 102, 104, 106. Setting the setpoint of the DC/DC converter 38 higher provides a greater voltage, and thus more power, to the respective power-distribution-board bus 102, 104, 106, and setting the setpoint of the DC/DC converter 38 lower provides less voltage, and thus less power, to the respective power-distribution-board bus 102, 104, 106.

A plurality of power-distribution boards 108, 110, 112 include a base power-distribution board 108, a primary power-distribution board 110, and a secondary power-distribution board 112. The power-distribution boards 108, 110, 112 divide electricity into subsidiary circuits, i.e., the loads 98. The power-distribution boards 108, 110, 112 each include one of the power-distribution-board buses 102, 104, 106 and one or more fuses 114. The power-distribution-board buses 102, 104, 106 include a base power-distribution-board bus 102 in the base power-distribution board 108, a primary power-distribution-board bus 104 in the primary power-distribution board 110, and a secondary power-distribution-board bus 106 in the secondary power-distribution board 112.

Each low-voltage battery 40 produces a voltage less than 60 volts direct current, e.g., 12 or 48 volts direct current. The low-voltage batteries 40 may be any type suitable for providing low-voltage electricity for power the loads 98, e.g., lithium-ion, nickel-metal hydride, lead-acid, etc. For example, the low-voltage battery 40 electrically coupled to the base power-distribution board 108 is a lead-acid battery, and the low-voltage batteries 40 electrically coupled to the primary power-distribution board 110 and to the secondary power-distribution board 112 are lithium-ion batteries. The low-voltage batteries 40 are electrically coupled to the powertrain 84 via the respective DC/DC converter 38 and the charger/inverter 96, and are electrically coupled to the loads 98 on the respective power-distribution boards 108, 110, 112.

The low-voltage batteries 40 each have a state of charge that can vary between 0% (no remaining charge) and 100% (fully charged). The state of charge can be measured by various sensors (not specifically shown) of the sensors 54 monitoring the low-voltage batteries 40 in communication with the computer 46. For example, the monitoring sensors can infer the state of charge from the current flowing through the low-voltage battery 40 and from the temperature of the low-voltage battery 40 using known relationships. The state of charge can alternatively be measured in units of electrical charge, e.g., ampere-hours. The state of charge as a percentage is equal to the state of charge in units of charge divided by a capacity of the low-voltage battery 40. The capacity of a battery is a maximum quantity of charge that the battery can store.

The loads 98 include the control modules 36 as well as other types of loads 98, e.g., the battery-energy control module 60; a high-voltage contactor 116 for the battery-energy control module 60 to control electricity flow to the DC/DC converters 38, etc.; the hybrid-powertrain control module 58; the engine control module 74; the body control module 62; the restraint control module 78; a data recorder 118; an air-conditioning system 120 or components or settings of the air-conditioning system 120 such as an AC fan or a high-speed mode; the accessory control module 80; a fan 122 for cooling the engine 44; an electric water pump 124 for the engine 44; power points 126 (i.e., sockets in a passenger cabin for passengers to plug in personal devices) (as all shown in FIG. 3A); the autonomous-vehicle platform-interface control module 72; the antilock-brake control module 64; the first power-steering control module 66; the collision-mitigation-system control module 70 (as all shown in FIG. 3B); the object-detection maintenance control module 76; an antilock-brake-system backup 128; the second power-steering control module 68; and the virtual-driver module 34 (as all shown in FIG. 3C).

An ignition-switch-power relay 130 is electrically coupled to the base power-distribution-board bus 102. The ignition-switch-power relay 130 is switchable between an open state and a closed state by a signal from the body control module 62. The body control module 62 can be activated by a signal from an ignition or push-button start (not shown). The ignition-switch-power relay 130 is positioned to, when closed, provide electrical current from the base power-distribution-board bus 102 to the engine control module 74, the hybrid-powertrain control module 58, the antilock-brake control module 64, and the power-steering control modules 66, 68. The hybrid-powertrain control module 58 can activate the high-voltage battery 42 from a dormant state to an active state. In the active state, the high-voltage battery 42 can provide a voltage difference to the powertrain 84 and to the DC/DC converters 38.

A plurality of control-module relays 132 are electrically coupled to the primary power-distribution-board bus 104. The control-module relays 132 are switchable independently of each other between an open state and a closed state by a signal from the computer 46. The control-module relays 132 can each be activated by electrical current from the base power-distribution-board bus 102. Each control-module relay 132 is positioned to, when closed, provide electrical current from the primary power-distribution-board bus 104 to one of the control modules 36, e.g., as shown in FIGS. 3A-C, the collision-mitigation-system control module 70, the autonomous-vehicle platform-interface control module 72, or the virtual-driver module 34.

In normal operation, the loads 98 are typically powered via the DC/DC converters 38 without drawing power from the low-voltage batteries 40. The low-voltage batteries 40 supply power in the event of transient demands from the loads 98 for greater power than the DC/DC converters 38 can supply.

For the purposes of this disclosure, "on state" is defined as the state of the vehicle 30 in which full electrical energy is provided to electrical components, i.e., the loads 98, of the vehicle 30 and the vehicle 30 is ready to be driven, e.g., the engine 44 is running; "off state" is defined as the state of the vehicle 30 in which a low amount of electrical energy is provided to selected loads 98 of the vehicle 30, typically used when the vehicle 30 is being stored; and "accessory-power state" is defined as the state of the vehicle 30 in which full electrical energy is provided to more electrical components than in the off state and the vehicle 30 is not ready to be driven. Typically, an occupant puts the vehicle 30 into the on state when the occupant is going to drive the vehicle 30, puts the vehicle 30 into the off state when the occupant is going to leave the vehicle 30, and puts the vehicle 30 into the accessory-power state when the occupant is going to sit in but not drive the vehicle 30.

Figure 4:
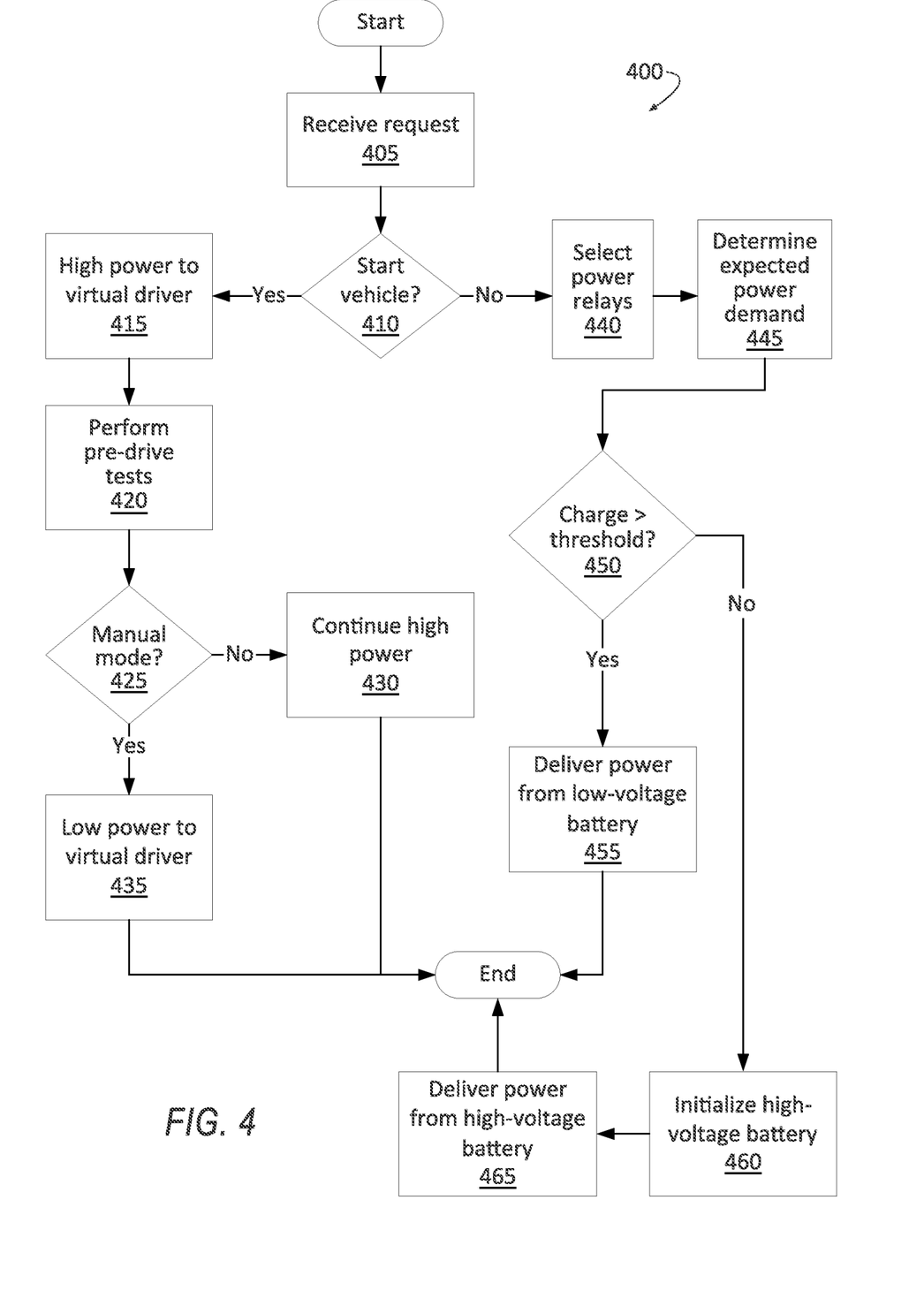
FIG. 4 is a process flow diagram of an example process for providing power to loads in the power-distribution system.

FIG. 4 is a process flow diagram illustrating an exemplary process 400 for providing power to the loads 98 in the power-distribution system 100. The memory of the computer 46 stores executable instructions for performing the steps of the process 400. As a general overview of the process 400, the computer 46 receives a request; if the request is to start the vehicle 30 in a manual mode, starts the vehicle 30, provides high power to the virtual-driver module 34 to perform pre-drive tests, and then provides low power to the virtual-driver module 34; if the request is to start the vehicle 30 in an autonomous mode, starts the vehicle 30 and provides high power to the virtual-driver module 34 both during and after the virtual-driver module 34 performs the pre-drive tests; and if the request is to perform an operation such as a download with one of the control modules 36, uses the low-voltage battery 40 for an operation with an expected power draw below a threshold and initializes and uses the high-voltage battery 42 for an operation with an expected power draw above the threshold. The process 400 occurs while the vehicle 30 is in the off state.

The process 400 begins in a block 405, in which the computer 46 receives a request. The request is an instruction for the computer 46 or one of the control modules 36 to perform one or more actions. The request can originate in a remote server and be transmitted to the computer 46 via the transceiver 82 and the communications network 56.

Next, in a decision block 410, the computer 46 determines whether the request is a request to start the vehicle 30, i.e., switch the vehicle 30 from the off state to the on state, or alternatively whether the request is for one of the control modules 36 to perform some action. The computer 46 reads the content of the request to make the determination. If the request is to start the vehicle 30, the process 400 proceeds to a block 415. If the request is for one of the control modules 36 to perform an action, the process 400 proceeds to a block 440.

In the block 415, the computer 46 puts the virtual-driver module 34 in a high-power-draw state. For the purposes of this disclosure, a "high-power-draw state" of a load 98 is a state in which the load 98 consumes a relatively high quantity of power, and a "low-power-draw state" of the load 98 is a state in which the load 98 consumes a relatively low quantity of power. For example, the computer 46 can put the virtual-driver module 34 in the high-power-draw state by setting the setpoint of the DC/DC converter 38 coupled to the secondary power-distribution-board bus 106 at a first voltage that is a relatively high voltage. The first voltage is chosen to be sufficiently high to power the virtual-driver module 34 in the autonomous mode, e.g., as specified by a supplier of the virtual-driver module 34, a manufacturer of the vehicle 30, etc.

Next, in a block 420, the computer 46 performs at least one pre-drive test on the vehicle 30. For the purposes of this disclosure, a "pre-drive test" is a check of a system of the vehicle 30 that occurs upon starting the vehicle 30, i.e., upon switching the vehicle 30 from the off state or the accessory-power state to the on state.

For example, the pre-drive tests can include checking whether the charge of the high-voltage battery 42 and/or the low-voltage batteries 40 is sufficiently high to put the vehicle 30 in a minimal risk condition. For the purposes of this disclosure, "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, Automated Driving Systems 2.0: A Vision for Safety, at 26 (citing SAE International J3016, International Taxonomy and Definitions for Terms Related to Driving Automation Systems for On-Road Motor Vehicles (J3016: September2016)).) For example, putting the vehicle 30 in the minimal risk condition may be initiating a handover to the human driver or autonomously driving the vehicle 30 to a halt at a roadside, i.e., stopping the vehicle 30 outside active lanes of traffic. To determine whether a charge is sufficiently high to put the vehicle 30 in a minimal risk condition, the computer 46 can determine whether the charge is above a charge threshold stored in the memory of the computer 46. The charge threshold is chosen by experimentally testing how much charge is consumed to put the vehicle 30 in the minimal risk condition.

For another example, the pre-drive tests can include performing a steering action and determining whether data from steering-angle sensors among the sensors 54 match the steering action. The computer 46 can instruct the steering system 52 to turn the wheels 86 with a preset torque stored in the memory of the computer 46, and the computer 46 can check whether the angles received from the steering-angle sensors are within a threshold error angle of a prestored steering angle. The prestored steering angle is chosen to correspond to the steering angle of the wheels 86 upon applying the prestored torque, and the threshold error angle is chosen to correspond to the resolution of the steering-angle sensors.

For another example, the pre-drive tests can include performing a braking action and determining whether data from brake sensors of the sensors 54 match the braking action. The computer 46 can instruct the brake system 50 to apply the brakes with a preset force stored in the memory of the computer 46, and the computer 46 can check whether the force reported by the brake sensors are within a force-error threshold of the preset force. The force-error threshold is chosen to correspond to the resolution of the brake sensors.

Next, in a decision block 425, the computer 46 determines whether the request to start the vehicle 30 is a request to start the vehicle 30 in the manual mode or the autonomous mode. A semi-autonomous mode, if applicable to the vehicle 30, may be classified for purposes of the block 425 with either the manual mode or the autonomous mode depending on whether the power draw of the virtual-driver module 34 in the semi-autonomous mode is the high-power-draw state or the low-power-draw state. Alternatively, the semi-autonomous mode may be classified as a third option leading to a medium-power-draw state (not shown). The computer 46 reads the content of the request to make the determination. If the request is to start the vehicle 30 in an autonomous mode, the process 400 proceeds to a block 430. If the request is to start the vehicle 30 in the manual mode, the process 400 proceeds to a block 435.

In the block 430, the computer 46 maintains the virtual-driver module 34 in the high-power-draw state. The virtual-driver module 34 thus continues to be in the high-power-draw state into which it was put in the block 415. After the block 430, the process 400 ends.

In the block 435, the computer 46 puts the virtual-driver module 34 in the low-power-draw state. For example, the computer 46 can put the virtual-driver module 34 in the low-power-draw state by setting the setpoint of the DC/DC converter 38 coupled to the secondary power-distribution-board bus 106 at a second voltage that is a relatively low voltage. The second voltage is chosen to be sufficiently high to power the virtual-driver module 34 in the manual mode but not in the autonomous mode. The second voltage is lower than the first voltage. After the block 435, the process 400 ends.

In the block 440, the computer 46 selects which control modules 36 and/or power-distribution-board bus 102, 104, 106 to energize in order to minimize an expected power demand. For example, if the request is a download to the collision-mitigation-system control module 70, then the computer 46 can open the control-module relay 132 leading to the collision-mitigation-system control module 70, which can thereby be supplied with electrical power from the base power-distribution-board bus 102 without activating the primary power-distribution-board bus 104. For another example, if the request is a download to the object-detection maintenance control module 76, then the computer 46 can activate the secondary power-distribution-board bus 106 without activating the primary power-distribution-board bus 104.

Next, in a block 445, the computer 46 determines the expected power demand for completing the action. For example, if the action is a download from a remote server to one of the control modules 36, the expected power demand can be estimated as an expected duration to complete the download and a rate of power consumption for the control module 36 in a downloading state and any other active components selected in the block 440. The expected duration can be estimated based on a file size and a current bandwidth, which can be a minimum bandwidth of a bandwidth of a network between the transceiver 82 and the remote server, a bandwidth of the transceiver 82, and a bandwidth of the communications network 56. The file size can be included in the request. The rate of power consumption of the control module 36 in a downloading state, as well as the corresponding other components, can be determined experimentally and stored in the memory of the computer 46.

Next, in a decision block 450, the computer 46 determines whether the charge in the low-voltage battery 40 electrically coupled to the control module 36 receiving the download is above a threshold. The threshold is chosen to determine whether the low-voltage battery 40 has sufficient charge to complete the download. The threshold can be a sum of the expected power demand, as determined in the block 440, and a charge to start the vehicle 30. The charge to start the vehicle 30 can be experimentally determined and stored in the memory of the computer 46. If the charge of the low-voltage battery 40 is above the threshold, the process 400 proceeds to a block 455. If the charge of the low-voltage battery 40 is below the threshold, the process 400 proceeds to a block 460.

In the block 455, the computer 46 provides power to the control module 36 from the respective low-voltage battery 40 for the control module 36 to complete the action. The high-voltage battery 42 remains in the dormant state. After the block 455, the process 400 ends.

In the block 460, the computer 46 initializes the high-voltage battery 42, i.e., switches the high-voltage battery 42 from the dormant state to the active state. For example, the computer 46 can instruct the ignition-switch-power relay 130 to turn on the hybrid-powertrain control module 58, and the hybrid-powertrain control module 58 can initialize the high-voltage battery 42.

Next, in the block 465, the computer 46 can provide power to the control module 36 from the high-voltage battery 42. For example, the computer 46 can set the setpoint of the DC/DC converter 38 coupled to the respective power-distribution-board bus 102, 104, 106 to a voltage based on the power demand. The voltage of the setpoint of the DC/DC converter 38 can be determined to provide sufficient power to complete the action. After the block 465, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a virtual-driver module;
   a DC/DC converter electrically coupled to the virtual-driver module;
   a low-voltage battery electrically coupled to the virtual-driver module;
   a high-voltage battery electrically coupled to the DC/DC converter; and
   a computer communicatively coupled to the DC/DC converter;
   wherein the computer is programmed to
      in response to a request to switch a vehicle including the virtual-driver module from an off state to an on state in a manual mode, the vehicle being in the off state at the time of the request, set a setpoint of the DC/DC converter at a first voltage, wherein the manual mode means that a human driver controls a propulsion, brake system, and steering system of the vehicle;
      then perform at least one pre-drive test on the vehicle; and
      then set the setpoint of the DC/DC converter at a second voltage lower than the first voltage.

2. The system of claim 1, wherein the vehicle is operable in the manual mode or in an autonomous mode, and the vehicle in the autonomous mode is operable by the virtual-driver module independently of intervention by the human driver.

3. The system of claim 1, wherein performing the pre-drive test includes performing a steering action and determining whether data from steering-angle sensors match the steering action.

4. The system of claim 1, wherein performing the pre-drive test includes performing a braking action and determining whether data from brake sensors match the braking action.

5. A system comprising a computer including a processor and a memory storing instructions executable by the processor to:
   in response to a request to switch a vehicle from an off state to an on state in a manual mode, the vehicle being in the off state at the time of the request, put a virtual-driver module in a high-power-draw state, wherein the manual mode means that a human driver controls a propulsion, brake system, and steering system of the vehicle;
   then perform at least one pre-drive test on the vehicle; and
   then put the virtual-driver module in a low-power-draw state.

6. The system of claim 5, further comprising a DC/DC converter electrically coupled to the virtual-driver module and communicatively coupled to the computer, wherein putting the virtual-driver module in the high-power-draw state is setting a setpoint of the DC/DC converter at a first voltage, and putting the virtual-driver module in the low-power-draw state is setting the setpoint of the DC/DC converter at a second voltage lower than the first voltage.

7. The system of claim 5, wherein performing the pre-drive test includes at least one of determining whether a charge of a battery is sufficiently high to put the vehicle in a minimal risk condition, performing a steering action and determining whether data from steering-angle sensors match the steering action, or performing a braking action and determining whether data from brake sensors match the braking action.

8. The system of claim 5, wherein the instructions further include to, in response to a request for an action by a control module while the vehicle is in the off state, provide power to the control module from a low-voltage battery upon determining that a charge of the low-voltage battery is above a threshold that is based on a power demand of the action.

9. The system of claim 8, wherein the instructions further include to, in response to the request for the action by the control module while the vehicle is in the off state, initialize a high-voltage battery and provide power to the control module from the high-voltage battery upon determining that the charge of the low-voltage battery is below the threshold.

10. The system of claim 9, further comprising a DC/DC converter electrically coupled to the control module and communicatively coupled to the computer, wherein providing power to the control module from the high-voltage battery includes setting a setpoint of the DC/DC converter based on the power demand of the action.

11. The system of claim 8, wherein the action is downloading an update for the control module.

12. A method comprising:
   in response to a request to switch a vehicle from an off state to an on state in a manual mode, the vehicle being in the off state at the time of the request, putting a virtual-driver module in a high-power-draw state by a computer, wherein the manual mode means that a human driver controls a propulsion, brake system, and steering system of the vehicle;
   then performing at least one pre-drive test on the vehicle by the computer; and
   then putting the virtual-driver module in a low-power-draw state by the computer.

13. The method of claim 12, wherein putting the virtual-driver module in the high-power-draw state is setting a setpoint of a DC/DC converter electrically coupled to the virtual-driver module at a first voltage, and putting the virtual-driver module in the low-power-draw state is setting the setpoint of the DC/DC converter at a second voltage lower than the first voltage.

14. The method of claim 12, wherein performing the pre-drive test includes at least one of determining whether a charge of a battery is sufficiently high to put the vehicle in a minimal risk condition, performing a steering action and determining whether data from steering-angle sensors match the steering action, or performing a braking action and determining whether data from brake sensors match the braking action.

15. The method of claim 12, further comprising, in response to a request for an action by a control module while the vehicle is in the off state, providing power by a computer, to the control module from a low-voltage battery upon determining that a charge of the low-voltage battery is below a threshold that is based on a power demand of the action.

16. The method of claim 15, further comprising, in response to the request for the action by the control module while the vehicle is in the off state, initializing a high-voltage battery and providing power to the control module from the high-voltage battery upon determining that the charge of the low-voltage battery is above the threshold, by a computer.

17. The method of claim 16, wherein providing power to the control module from the high-voltage battery includes setting a setpoint of a DC/DC converter electrically coupled to the control module based on the power demand of the action.

18. The method of claim 15, wherein the action is downloading an update for the control module.

* * * * *